Dec. 1, 1931.    W. A. MORTON ET AL    1,833,951
TRANSFERRING MECHANISM
Filed Feb. 21, 1929
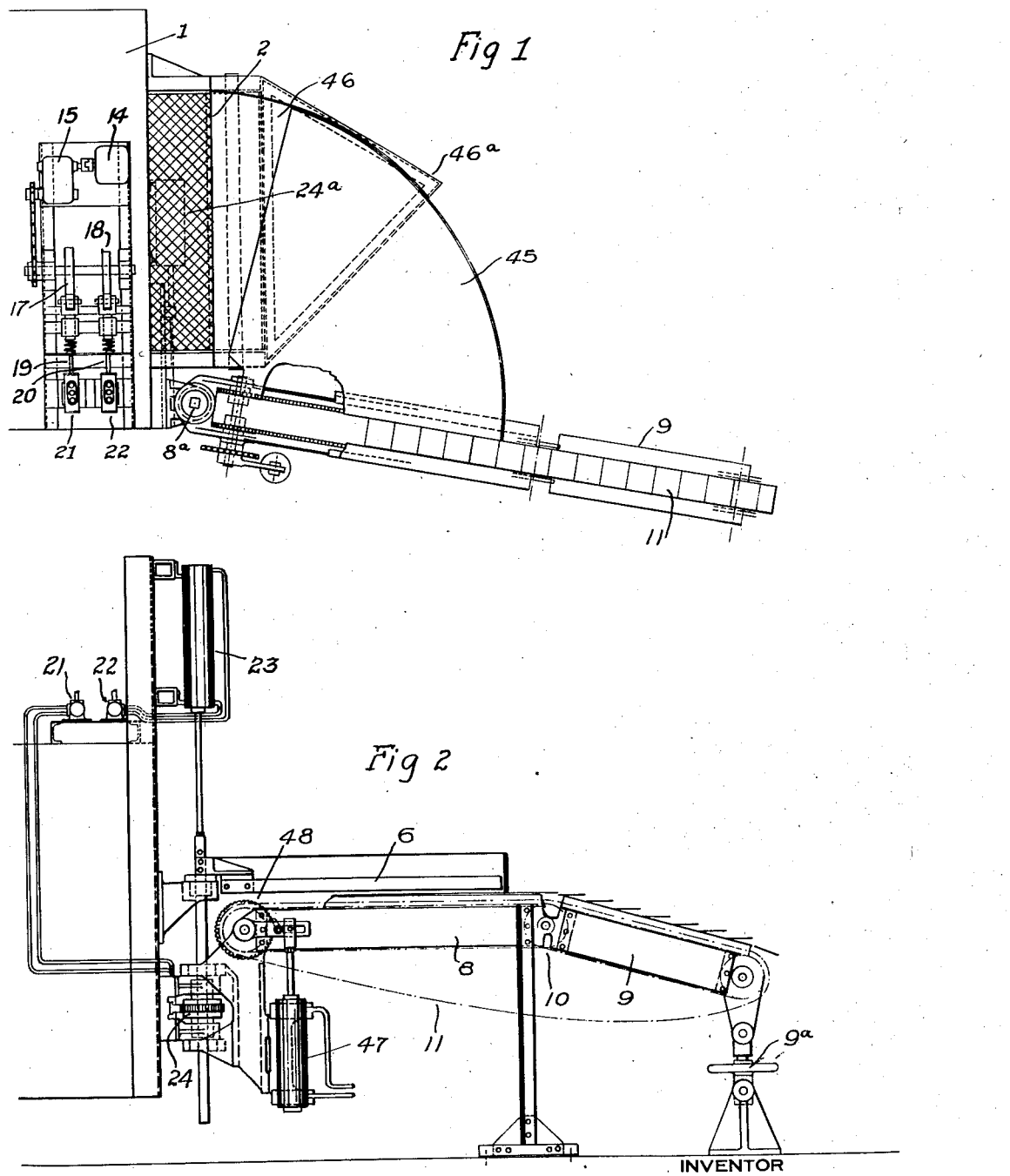
INVENTOR
William A. Morton
Carl A. Nielsen
by William B. Jaspert
Attorney.

Patented Dec. 1, 1931

1,833,951

UNITED STATES PATENT OFFICE

WILLIAM A. MORTON, OF PITTSBURGH, AND CARL A. NIELSEN, OF BELLEVUE, PENNSYLVANIA, ASSIGNORS TO THE AMSLER MORTON COMPANY, OF PITTSBURGH, PENNSYLVANIA, A CORPORATION OF PENNSYLVANIA

TRANSFERRING MECHANISM

Application filed February 21, 1929. Serial No. 341,671.

The present invention is a continuation in part of an application bearing Serial Number 304,738, filed September 8, 1928, wherein is disclosed an inclined loading mechanism adapted to cooperate with a bottle forming or molding machine and an annealing lehr, to transfer the glassware from the machine to the lehr conveyor.

The present invention includes employment of an adjustable apron or support for the ware over which it is moved when transferred from the loading mechanism to the conveyor element of the lehr, whereby the loading element may be disposed at various angles with respect to the normal axis of the conveyor without interfering with the efficient transferring of the ware to the lehr conveyor.

Another object of the invention is the provision of means whereby the several movements of the apparatus are coordinated to obtain automatic operation of the loading and transferring devices.

In the accompanying drawings constituting a part hereof, and in which like reference characters, designate like parts, Fig. 1 is a top plan view of the transferring mechanism embodying the principle of this invention, and portions of the annealing lehr and loading device illustrating the manner in which the transfer mechanism cooperates therewith, and Fig. 2 is a side elevational view thereof.

Referring to the figures of the drawings, the structure therein illustrated comprises an annealing lehr generally designated at 1, having a woven wire conveyor 2 which is an endless conveyor belt traversing the length of the lehr and extending in the manner shown in Fig. 1 to constitute a loading platform on which the glassware to be annealed is charged into the lehr. The loading device, as described in the co-pending application referred to, consists of an endless conveyor belt 11 passing over a horizontal frame portion 8 and an inclined frame portion 9 which is hinged to the member 8 at 10 and which is adapted for adjustment through a screw jack mechanism 9a. When the ware is conveyed to the horizontal portion 8 of the conveyor, it is placed in an arm 6 that is pivotally mounted to swing in the direction of the lehr conveyor 2.

In accordance with the present invention I provide an apron support 45 which is supported on the horizontal portion 8 of the conveyor frame and which is adapted to cooperate with an apron support 46 that is secured to the end of the annealing lehr terminating adjacent the woven wire conveyor 2. The transfer arm is adapted to slide the glassware over the top of the supports 45 and 46 and by virtue of the apron 45 being superposed on the member 46, they are adapted to overlap so that an uninterrupted ware supporting surface is provided within the range of swinging movement of the arm 6.

The object of providing for angular movement of the loading device is to permit the loading of the annealing lehr from machines located in different points with respect to the charging end of the lehr and by providing the overlapping apron or support for cooperation with the transferring arm 6, the various adjustments for the proper position of the loading device are readily made.

As shown in the figures of the drawings, the operating parts of the machine are actuated by fluid pressure means such as the fluid pressure actuating device 23 which raises and lowers the transfer arm 6, a fluid pressure actuating member 24a which operates the ratchet mechanism 24 that swings the arm 6 from the position in alinement with the loading device to its position transversely of the conveyor belt.

In Figure 2 a fluid pressure member 47 is illustrated as adapted to actuate a ratchet mechanism generally designated at 48 which operates the conveyor belt 11 and the several movements of the transfer arm and conveyor belt 11 are coordinated to operate at timed intervals by the timing mechanism shown mounted on top of the annealing lehr. This timing mechanism consists of a motor 14 operating through a speed reducer gear to a cam shaft on which cams 17 and 18 are mounted. The cams are cooperatively engaged with followers that actuate piston elements 19 and 20 of a pair of sliding valves 21 and 22 which connect with a source of fluid pressure and with the fluid pressure cylinders 23, 24a, and 47.

By the timing of the valves through the cam mechanism, the fluid pressure devices operate to raise, lower, and swing the ware transfer arm 6 at timed intervals corresponding with the advancement of the conveyor belt as effected by the fluid pressure device and ratchet mechanism 47 and 48, thus assuring complete automatic operation.

To set the loading conveyor for its proper cooperation with the takeout device, it is only necessary to swing the conveyor frame on its pivotal connection at 8a with the annealing lehr, no further adjustment being required other than to provide for the proper degree of swing of the transfer arm 6 which is regulated by adjusting the stroke of the ratchet mechanism 24.

It is evident from the foregoing description of this invention that a loading and transferring mechanism made in accordance therewith is especially adapted to the efficient handling of molded glassware in transferring the same from the takeout device of a molding machine to the conveyor element of an annealing lehr, and that thereby the lehr may be made to serve a variety of machines without moving it with respect thereto.

Although one embodiment of the invention has been herein illustrated and described, it will be obvious to those skilled in the art that various modifications may be made in the details of construction without departing from the principles herein set forth.

We claim herein as our invention:

1. The combination with an annealing lehr of a conveyor mechanism connected for angular movement with one end of said lehr, a pair of aprons fastened to the lehr and conveyor member respectively and overlapping each other to form a continuous ware-supporting surface between the conveyor and lehr for any angular position of the latter and a transfer device adapted to engage the ware on the conveyor and transfer the same over the supporting aprons to the receiving surface of the lehr conveyor.

2. Apparatus as set forth in claim 1 in which the transfer mechanism is adapted for vertical and angular movement whereby it is lowered on the glassware to engage the same, swing to the position in which the ware is placed on the lehr conveyor, and rise vertically to release the ware and then return to its receiving position on said conveyor.

3. Apparatus as set forth in claim 1 in which the transfer mechanism is subjected to vertical and angular movement to engage the ware on the conveyor, transfer the same to the lehr conveyor and subject it to vertical movement to release the ware when so delivered, and means for co-ordinating the movements of the transfer mechanism with the speed of the conveyor delivering the ware to the annealing lehr.

4. The combination with an annealing lehr and a loading device of a transfer mechanism, said loading device having connection with the lehr to be angularly movable with respect thereto, an apron secured to the end of said lehr, and an apron secured to said loading device, said aprons being adapted to overlap when the lehr and loading device are subjected to relative angular movement.

In testimony whereof we have hereunto set our hands this 19th day of February, 1929.
WILLIAM A. MORTON.
CARL A. NIELSEN.